UNITED STATES PATENT OFFICE.

JACOB SHOTWELL ROBESON, OF AU SABLE FORKS, NEW YORK, ASSIGNOR TO ROBESON PROCESS COMPANY, OF CAMDEN, NEW JERSEY, A CORPORATION OF NEW JERSEY.

ROAD-MAKING.

1,236,875.  Specification of Letters Patent.  Patented Aug. 14, 1917.

No Drawing.   Application filed February 27, 1911.   Serial No. 611,163.

*To all whom it may concern:*

Be it known that I, JACOB S. ROBESON, a citizen of the United States, residing at Au Sable Forks, in the county of Essex and State of New York, have invented certain new and useful Improvements in Road-Making, of which the following is a specification.

This invention relates to road making; and it comprises a process of making roads wherein a road is surfaced with a two-component mixture of mineral road making materials, one such component being a calcareous and basic material and the other such component being a silicate material, such silicate material being best composed of, or comprising, feldspathic materials, that is rock comprising double silicates of alumina and alkali and breaking down to give clayey material, and such mixture is treated with a preparation of waste sulfite liquor; and it also comprises a road having a surface comprising a mixture of calcareous material, silicate material and a waste sulfite liquor preparation; all as more fully hereinafter set forth and as claimed.

In making macadam and similar roads it is customary to use but one given material, such as crushed rock, gravel or the like for any given stretch of the road bed, though sometimes a mixture of gravel and crushed rock is employed for the sake of a better bond. Gravel is usually mainly quartzose silica, though of course it often contains minor amounts of clay, silicates, humus, etc.; and silica in a quartzose form has no chemical action on silicates at ordinary temperatures. In ordinary practice where crushed rock is used but one single kind of rock is employed in any given stretch of road, the use of varied sizes of the same rock being relied upon for bonding. It has however been found that much better results may be obtained by using a two-component material for the road bed, one such component being a basic calcareous material, such as crushed limestone screenings, shells, marl, etc., and the other a silicate rock, as distinguished from silica in the form of quartz or gravel. Limestone by itself, because of its limited solubility in water, particularly where the water contains carbon dioxid, serves to exercise what may be termed in a way a cementing action upon rock fragments, whether of limestone or of any other rock. Limestone however alone gives a rather dusty road. A bonding action of another kind, probably due to decomposition by air and moisture, is found with fragments of some of the silicate rocks used by themselves; and this decomposition appears to be facilitated by the presence of limestone. At all events, a better road is made by the mixture of the two types, a calcareous rock and a silicate rock; and particularly where the silicate rock is of the feldspathic clay-yielding type, such as feldspar, granite, gneiss, rhyolite, etc. Other silicates containing iron and alumina and yielding clay on breaking down, whether natural or artificial, such as slags, however, manifest the same actions though usually in a less degree than feldspathic materials. Any rocky material containing compound silicates comprising silicates of alumina and the like with silicates of alkaline bases such as potassium, sodium, calcium or the like, is particularly suitable though the feldspars, and rocks containing feldspars, I regard as the best.

I have found that with such a two-component road mixture an impregnation of the material with a preparation of waste sulfite liquor gives markedly better results for a number of reasons, both chemical and physical. In the sulfite process of making paper pulp, woody material is heated under pressure with a solution of bisulfites; which are ordinarily bisulfites of lime and magnesia, dolomitic lime being used in making the sulfites. About half the wood remains as cellulose and the other half goes into solution. As the non-cellulose of the wood is mainly what is called "lignone" and as the new soluble combinations appear to be in the nature of salts of sulfonic acids, the soluble matter is often called for the sake of brevity a "lignosulfonate." Ordinarily the liquor contains lignosulfonates of lime and magnesia. While the lignone of various woods differs somewhat and with this difference occurs a corresponding difference in the lignosulfonate, the wood of the American spruce (*Picea, sp.*) gives a waste liquor which has excellent properties for the present purposes.

The sulfite waste liquor as it comes from the digesters is a thin liquid of somewhat acid reaction. Its soluble constituents appear to be mainly the stated lignosulfonates, most of the sulfite and bisulfite as such having disappeared. Under the reduction of pressure incident to releasing the superheated fluid from the digester most of the contained sulfur dioxid flashes off as gas and such neutral sulfite as may remain becomes insoluble. This thin liquid is quite sensitive and unstable, readily decomposing, and particularly when acid. Acid appears to induce a change, probably hydrolytic, resulting in the formation of more acid so that the reaction, once begun is self-accelerating. By use of proper precautions (see Patent 833,634) the liquor may be evaporated to a thick dense liquid of perfectly stable nature, even upon redilution to the initial strength, and of valuable properties for various purposes. Like the original, this thick concentrated liquid may be called a solution of lignosulfonates.

While the original liquid, apart from its instability and dilution, seems to be not so well suited for the present purposes, the concentrated liquid, or such liquid rediluted to an appropriate degree, is very efficient. The lignosulfonates contained are highly colloid in their nature and exercise to a high extent the peculiar action of colloid solutions upon colloid materials, such as clay and the like, giving not only a binding action between clay particles but changing the nature of the clay particles in some manner; the action in this respect being analogous to but not identical with the action of tannin upon clay. While the sulfite liquor probably does not contain true tannin, it nevertheless exercises similar tanning properties. In addition to the chemico-physical colloidal action, the liquid apparently exercises a hydrolytic action upon feldspathic minerals, breaking them down. Feldspathic minerals decompose in time in the presence of moisture and carbon dioxid in any event, but in the presence of the sulfite waste liquor this breaking down seems to be much facilitated and accelerated. The action is much quicker and much more positive than with water alone with feldspathic minerals. One of the main products of the breaking down is clay or kaolin though other substances such as alkali silicates, hydrated silicates containing alkali, etc., are also formed. Kaolin is an extremely finely divided clayey substance upon which the colloiding action of the sulfite waste liquor takes full effect. With a feldspathic mineral, a calcareous mineral and sulfite waste liquor preparations chemical and physical actions take place which give a road surface of extreme hardness and solidity. Probably the sulfite waste liquor acts to break down, or accelerate the breaking down of, the silicates and the lime acts in the formation of new hydrated silicates which are bodies of a colloid nature, and the sulfite waste liquor then exercises the stated colloid influences on the consistency of these silicates. Colloid mixtures dry down to a hard, horny consistency which is very different from the consistency of crystalline materials.

As an example of the action considered in the present invention may be cited a series of experiments on a macadam road about a mile long and containing crushed feldspathic fieldstone. One section of the road was treated with a waste sulfite liquor preparation alone. This gave a hard and compact road bed though the top might have been described perhaps as rather rough. The sulfite liquor preparation had exercised a colloiding and uniting action but the material was rather too coarse and too fresh and too little hydrolyzed for full action. Another section of the same road containing feldspathic rock was given a limestone admixture but was not treated with waste sulfite liquor. This gave a good road bed but one which might have been described as loose in the body or aggregate though fairly firm on top. It broke easily under the hoof whereas the former section did not, and on the whole it was not as good as such former section. In still another section of the same road both limestone and a waste sulfite liquor of the nature described were employed together and the body and surface of the road soon consolidated into a concrete-like structure, quite different in character from either of the other sections. In this last section of the road where the silicate rock, the calcareous rock and the waste liquor preparation of the character described were used together the results were very much better; and this betterment was not only in degree but in kind—the road was markedly different from that obtained from the use of any two of the stated components. The two sections with the waste sulfite liquor preparations were better than the one without, but the 3-ingredient section was very much better than either of the others.

As the sulfite waste liquor leaves the digester it is as stated, practically a solution of the lignosulfonates of lime and magnesia and when concentrated these bodies remain in it. As lime is a body of crystalline nature, the solution containing lime is not quite so colloidal as where the lime is replaced by a sesquioxid base, such as alumina, ferric oxid or chromium oxid. These sesquioxid bases tend to give colloidal salts and when replacing the lime in the sulfite waste liquor they give a product which is of very much more colloidal nature and of slightly acid reaction and which is better suited for the present purposes. This replacement may be very simply done by treating the concentrated waste sulfite liquor with a sulfate of the particular sesquioxid desired. Sulfate of calcium is formed by a double decomposition and the sesquioxid base remains in solution in combination with the organic acids. A suitable preparation may be made by treating 200 pounds of concentrated waste sulfite liquor (Patent 833,634) of a consistency of about 31° B. with 20 to 25 pounds of ordinary commercial sulfate of alumina. The sulfate may be dissolved in 40 to 75 pounds of water before adding. For the iron and chromium compounds corresponding amounts of sulfate of these metals may be employed.

However, the concentrated waste sulfite liquor of the type described may be used as such without replacing the lime by a sesquioxid. This was the preparation used in the described experiment.

The road in the present invention may be made in the manner usual for a macadam road, using however a mixture of crushed limestone and crushed silicate rock. One component may be finer than the other to give a betterment of the physical bond. Or it may be first made with crushed rock of one type and then given a dressing of crushed rock of the other type. Finally it may be sprinkled with a waste sulfite liquor product, which is best of the stated nature. With a road surfacing of about six inches in depth, a sulfite waste liquor preparation may be applied in about the proportion of 0.3 to 1.5 gallons of the concentrated liquor of 30° B. per square yard. The amount however depends very much on the character of the particular rock mixture used and may readily be advantageously more or less. However the proportions stated have so far proved efficient. This application may be all at one time or as a series of successive applications. The sulfite liquor may of course be mixed with the materials, or one of them, prior to applying to the road; but this is ordinarily not necessary or convenient. Usually it is best to dilute the concentrated liquor to secure efficient commixture with the road materials and a good distribution.

After the roadway has been made as described and the sulfite liquor applied, it may in some cases advantageously later be treated with oil. In no event however should the oil and the sulfite liquor be applied simultaneously since oil will cling to the surface of the rock particles and prevent the contacting and chemical action of the sulfite liquor therewith. Any application of the oil should be after the application of the sulfite liquor; and it is best postponed for some time. While the action of the sulfite liquor upon the minerals takes some time to complete, yet if the sulfite liquor be once in contact with the rock a subsequent addition of oil may do no harm as it does not prevent or do away with the wetting by the sulfite liquor. As the road material breaks down under traffic however there is some danger of the fresh fractures becoming oiled. A subsequent application of oil is in some respects useful, not because the oil has any specific road-making properties in this relation but because it acts as a shield against the weather in rainy seasons. Oil in and of itself has only the road-making property of any fluid. Any liquid in thin films possesses a relatively enormous mechanical strength and thin films of oil between proximate dust and sand particles unite them together with considerable strength, the phenomena being similar to that well known in beach roads where the water unites the sand together. There is no other action of oil however unless it contains, as it often does, an asphaltic base which will leave a residuum of asphalt to unite the particles together after the main body of the oil has been removed by seepage or evaporation. The shielding action of the oil is however in some respects undesirable. The hydrolytic action of the sulfite waste liquor depends on the presence of moisture and if the treated road be dried down and then sealed by oil this hydrolytic action stops. The use of oil is therefore a matter of expediency and depends on the climate. There is the disadvantage that should the sulfite liquor be once washed away in part the application of oil may prevent an effective renewal of such sulfite liquor. Waste sulfite liquor preparations of the character described are soluble in water and may be removed to some extent by rain and wetting. The losses in this respect in practice are not what might be anticipated; but there is apt to be some loss. With the removal of the sulfite waste liquor the peculiar induced physical condition of the colloid clay particles disappears and also the hydrolytic action upon the silicate rock of course stops. By providing the finished road with a top dressing of oil, the washing away of the sulfite waste liquor is precluded; but also the renewal of moisture, or of sulfite liquor may also be precluded. When using oil it is best to employ oils which contain asphaltic constituents, either naturally present as in the case of Texas or California petroleum or artificially added as in a number of road oils made from various components, such as mixtures of Pennsylvania oil and Trinidad asphalts.

As the calcareous component of the road any crushed limestone whether dolomitic or not may be used, as may marl, oyster shells, lime, etc. Crushed limestone or limestone screenings are usually best.

In dry climates or weather it is often desirable to sprinkle with water from time to time to continue the action of the sulfite liquor in case it should become completely desiccated. Sulfite liquor solutions may also be used. In any event it is usually desirable to make new applications of sulfite liquor at intervals to provide treating material for the fresh rock surfaces produced under the crushing incident to traffic as well as to compensate for losses by washing away. Oil is apt to interfere with the utility of these treatments, and its use is to be carefully guarded and must depend on circumstances. But as stated, it is sometimes useful.

What I claim is:—

1. The process of making roads which comprises facing a roadway with a mixture of calcareous material, a clay yielding silicate rock and a preparation of sulfite waste liquor containing a sesquioxid.

2. The process of making roads which comprises facing a roadway with a mixture of a calcareous material, a clay yielding silicate rock and a preparation of sulfite waste liquor containing alumina.

3. The process of making roads which comprises facing a roadway with a mixture of a calcareous material and a clay yielding silicate rock, impregnating said mixture with a preparation of waste sulfite liquor containing a sesquioxid and subsequently giving a waterproofing application of oil.

4. The process of making roads which comprises facing a roadway with a mixture of a calcareous material and a clay yielding silicate rock, impregnating said mixture with a preparation of waste sulfite liquor containing alumina and subsequently giving a waterproofing application of oil.

5. A roadway having a surface composed of a mixture of calcareous material, clay yielding silicate rock and a preparation of sulfite waste liquor containing a sesquioxid as a base.

6. A roadway having a surface composed of a mixture of calcareous material, clay yielding silicate rock and a preparation of sulfite waste liquor containing alumina as a base.

In testimony whereof, I affix my signature in the presence of witnesses.

JACOB SHOTWELL ROBESON.

Witnesses:
H. J. LEGGETT,
L. C. BOLLES.

Copies of this patent may be obtained for five cents each, by addressing the "Commissioner of Patents, Washington, D. C."